UNITED STATES PATENT OFFICE 2,371,812

TREATMENT OF FISH WATER

Robert C. Ernst, Louisville, Ky., assignor to Louisville Drying Machinery Company, Louisville, Ky., a corporation of Kentucky No Drawing. Application December 15, 1941, Serial No. 423,034

6 Claims. (Cl. 99—2)

This invention relates to the treatment of fish water, and more particularly to the treatment of fish water prior to its concentration by evaporation to facilitate the evaporating step and produce a more desirable product for stock feed.

In processes now employed to recover fish meal for stock feed and other products including fish oil, it is the usual practice to cook fish usually by steaming it, press the oil and water from the cooked fish, press and dry the solids, and centrifuge the pressed liquid or otherwise separate the fish oil from the "fish" water. The "fish water" is subsequently evaporated to increase its concentration, the product obtained thereby being either returned to the pressed solids and dried therewith or marketed separately as a high vitamin product.

In the processing of the fish water to increase its concentration, multiple effect evaporators of the tube type are employed. With such evaporators, considerable difficulty has been encountered because of the accumulation of scale which greatly reduces the rate of heat transfer and the consequent efficiency and capacity of the evaporator, and also results in the loss of valuable organic and inorganic constituents of the fish water such as phosphates. Scale accumulates to such an extent that the tubes of an evaporator may become entirely blocked after only 4 or 5 hours of operation. The evaporator must then be taken out of service for a period of from 24 to 48 hours to permit removal of the scale which is a difficult and expensive task.

Until the present invention, the formation of this scale has been regarded as a necesary evil. An example of the attitude taken toward this problem is found in the following quotation from Chemical Engineers Handbook (1934), published by McGraw-Hill Book Co. Inc., at page 936, under the heading of Evaporation-scale formation and scale removal:

"If scale-forming substances are present, there is no way of preventing scale formation. The rate of scale formation may be decreased by using high velocities or by introducing seed crystals of the scale-forming material in suspension. Scale cannot be entirely prevented by this method. Removal of scale-forming impurities is often impossible and often too expensive. Consequently the problem is usually the removal of scale or the decrease in the rate of scale formation rather than its prevention."

\* \* \*

"Phosphate scales or scales containing much $Al_2O_3$ are exceedingly difficult to remove."

The present invention is directed to the substantial elimination of the scale problem in treating fish water, and the production of an improved product, and has as its principal object an improvement in the processing of fish water whereby scale formation is substantially eliminated and substantially all constituents of the original water are retained in soluble form which is particularly desirable in the case of products intended for stock feed.

A further object of this invention is an improvement in the process of treating fish water wherein the concentrating thereof is facilitated and the maximum efficiency and capacity of the employed evaporators are maintained at all times.

In attaining the aforesaid objectives, the present invention contemplates the addition of an acid compound to fish water prior to its evaporation or concentration sufficient to maintain the pH value of the water in the acid range during the concentration, the added acid compound being of a character substantially to form only soluble compounds with the constituents of the water which compounds remain substantially soluble throughout the evaporating step. The necessity for maintaining the solubility of substantially all the constituents down to a predetermined concentration eliminates the possibility of using such acids as sulphuric acid because they produce scale-forming salts such as calcium sulphate. In forming this scale, the insoluble compounds have been found to occlude and absorb valuable organic constituents in their precipitation and collection upon the tubes of the evaporator, thereby not only causing scale but also reducing the value of the ultimate product.

Normally, the fish water resulting from the treatment of fresh fish is neutral or slightly alkaline. In the case of rotten fish, the fish water may be slightly acid but it does not retain this acidity throughout the evaporating step because the organic acids therein break down under the application of heat. The present invention contemplates the insurance of an acid condition throughout the evaporation.

The acid compounds employed in lowering and maintaining the pH value of the fish water in the acid range are preferably selected from the group including the acid phosphates, acid chlorides and acid nitrates. In the preparation of a product that is to be used for stock feed, a definitely non-toxic compound such as phosphoric acid is preferably employed because of its contribution to the soluble phosphate content of the final product.

In the case of phosphoric acid, acid of a commercial grade or about 75% concentration is preferably added in the proportion of 1 gallon or 5.25 lbs. to 5250 gallons of fish water, this proportion having been found sufficient to maintain the pH value of the fish water in the acid range throughout the evaporating step. In the case of acid chlorides or acid nitrates, enough of the acid compound is added to insure that the pH value of the water will remain in the acid range throughout the evaporating step. This proportion of acid compound is in excess of the amounts of acid addition that have been proposed in the past for the fixation of the ammoniacal constituents of the fish water where only sufficient acid is added to convert the ammonia into relative stable salts, after which conversion, the fish water usually is neutral.

Preferably, the acid compound is metered into the fish water immediately prior to its entry into the evaporator whereupon evaporation can be conducted to the limit of solubility of the least soluble compounds.

With the addition of an acid compound as described, it has been found that the problem of scale accumulation has been substantially solved and that substantially all the original constituents of the fish water are retained. When an acid compound such as phosphoric acid is employed, the resulting product has been found to be greatly increased in soluble phosphate content, thereby increasing its value as a stock feed. The use of phosphoric acid has been found to have another advantage in that it functions to inhibit corrosion of the evaporator tubes, particularly in the case of iron tubes, and materially increases their life.

Having described my invention, I claim:

1. An improvement in the process of treating fish water by evaporation to increase the concentration thereof and simultaneously maintain the solubility of the constituents thereof comprising: adding, to the fish water, a quantity of an acidic phosphatic compound sufficient to maintain the pH of the water in the acid range during evaporation, said acid compound being of a character to form only compounds which remain substantially soluble throughout the evaporating step.

2. The process according to claim 1 wherein said acid compound is phosphoric acid.

3. The process according to claim 1 wherein said acid compound is phosphoric acid which is added in the approximate proportion of 1 pound to 1 thousand gallons of water.

4. An improvement in the process of producing stock feed of a highly soluble phosphate content from fish water comprising subjecting the fish water to evaporation to increase its concentration and simultaneously maintaining the solubility of the constituents thereof by adding a sufficient quantity of a non-toxic acidic phosphatic compound to maintain the pH of the water in the acid range during the evaporation, said acid compound being of a character to form only compounds which remain substantially soluble throughout the evaporating step.

5. An improvement in the process of producing stock feed of a highly soluble phosphate content from fish water which comprises: the step of subjecting the fish water to evaporation to increase its concentration and simultaneously maintaining the solubility of the constituents thereof by adding a sufficient quantity of phosphoric acid prior to evaporation to maintain the pH value of the water in the acid range during the evaporation.

6. The process according to claim 5 wherein the phosphoric acid is added in the proportion of 1 pound to 1000 gallons of water.

ROBERT C. ERNST.